(12) United States Patent
Aftanas

(10) Patent No.: US 7,878,743 B2
(45) Date of Patent: Feb. 1, 2011

(54) VEHICLE ARTICLE CARRIER HAVING COOPERATIVE TIE-DOWN AND LOAD BAR ASSEMBLIES

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 796 days.

(21) Appl. No.: 11/503,894

(22) Filed: Aug. 14, 2006

(65) Prior Publication Data

US 2008/0044250 A1    Feb. 21, 2008

(51) Int. Cl.
 *B60P 7/08*    (2006.01)
(52) U.S. Cl. .................. 410/150; 410/102; 410/104; 410/143; 410/152
(58) Field of Classification Search ............. 410/102, 410/104, 143, 146, 147, 148, 150, 152; 211/105.1, 211/105.3; 224/403, 322; 248/354.1
See application file for complete search history.

(56) References Cited

U.S. PATENT DOCUMENTS

| 3,554,416 | A |   | 1/1971  | Bott |
| 4,372,469 | A |   | 2/1983  | Kowalski et al. |
| 4,487,348 | A |   | 12/1984 | Mareydt |
| 4,834,599 | A | * | 5/1989  | Gordon et al. ............. 410/151 |
| 5,443,190 | A |   | 8/1995  | Cucheran et al. |
| 5,573,161 | A |   | 11/1996 | Stapleton |
| 5,577,650 | A |   | 11/1996 | Stapleton |
| 5,688,087 | A | * | 11/1997 | Stapleton et al. ............ 410/150 |
| 5,732,863 | A |   | 3/1998  | Stapleton |
| 5,732,864 | A |   | 3/1998  | Stapleton |
| 5,769,292 | A |   | 6/1998  | Cucheran et al. |
| 6,568,644 | B2 |  | 5/2003  | Pedersen |
| 6,722,541 | B1 | * | 4/2004 | Aftanas et al. |
| 6,793,186 | B2 |  | 9/2004  | Pedersen |
| 6,796,471 | B2 |  | 9/2004  | Aftanas et al. |
| 6,811,066 | B2 |  | 11/2004 | Aftanas et al. |
| 7,273,336 | B2 |  | 9/2007  | Silamianos et al. |
| 2006/0244279 | A1 | | 11/2006 | Ranka et al. |
| 2008/0101885 | A1 | | 5/2008  | Kmita |

* cited by examiner

*Primary Examiner*—Stephen Gordon
(74) *Attorney, Agent, or Firm*—Harness, Dickey & Pierce, P.L.C.

(57) ABSTRACT

A vehicle article carrier system employing a pair of support rails adapted to be secured to the sidewalls of a bed of a pick-up truck. Attached to the sidewalls are a pair of tie-down assemblies that can be fixedly secured at various points along each of the support rails. A load bar assembly is also included that can be quickly and easily attached to and detached from the tie-down assemblies. When the load bar is not in use, the tie-down assemblies can be used in connection with external bungee cords, nylon straps or other fastening implements to help restrain articles within the bed of the vehicle.

18 Claims, 9 Drawing Sheets

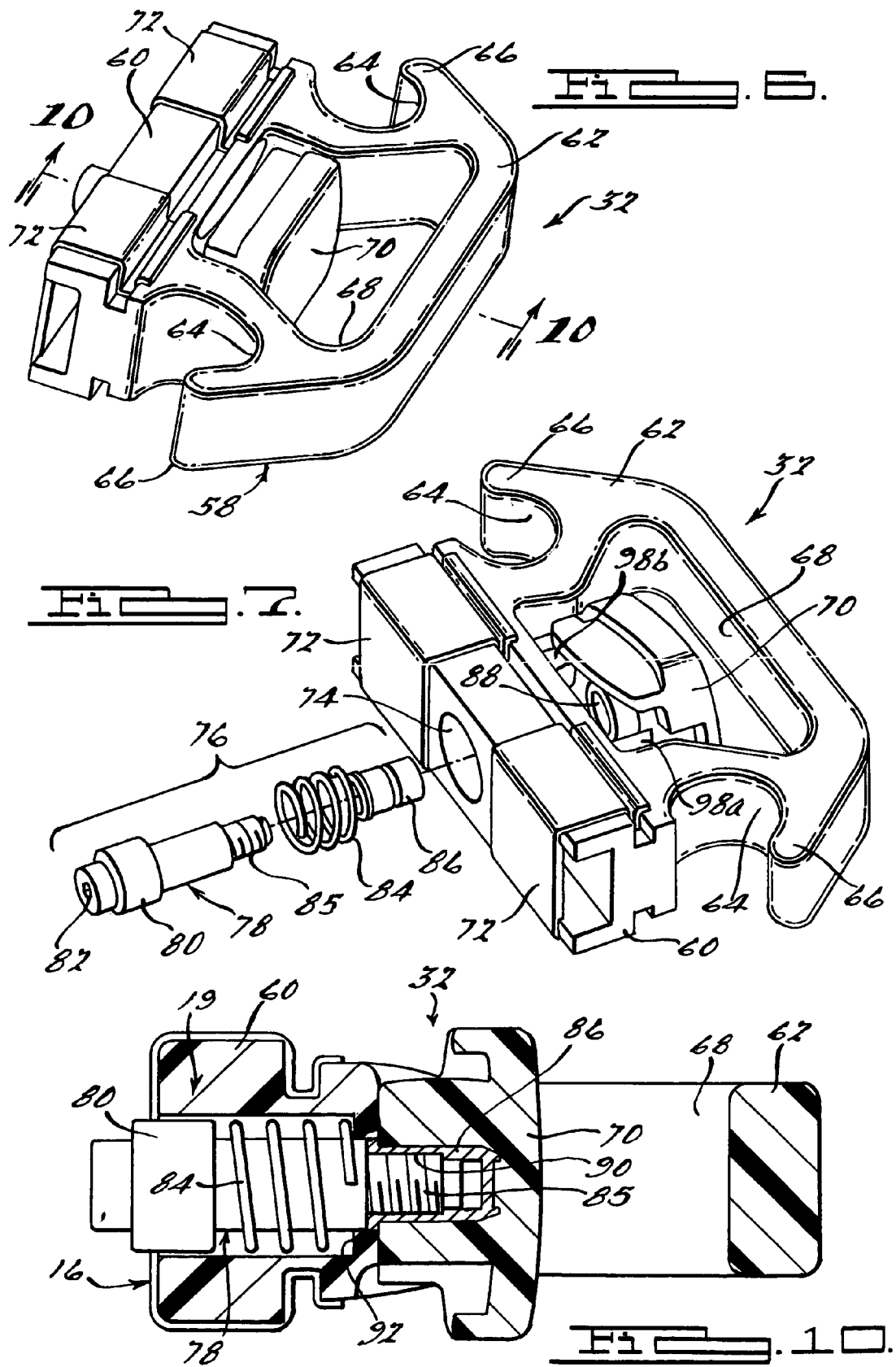

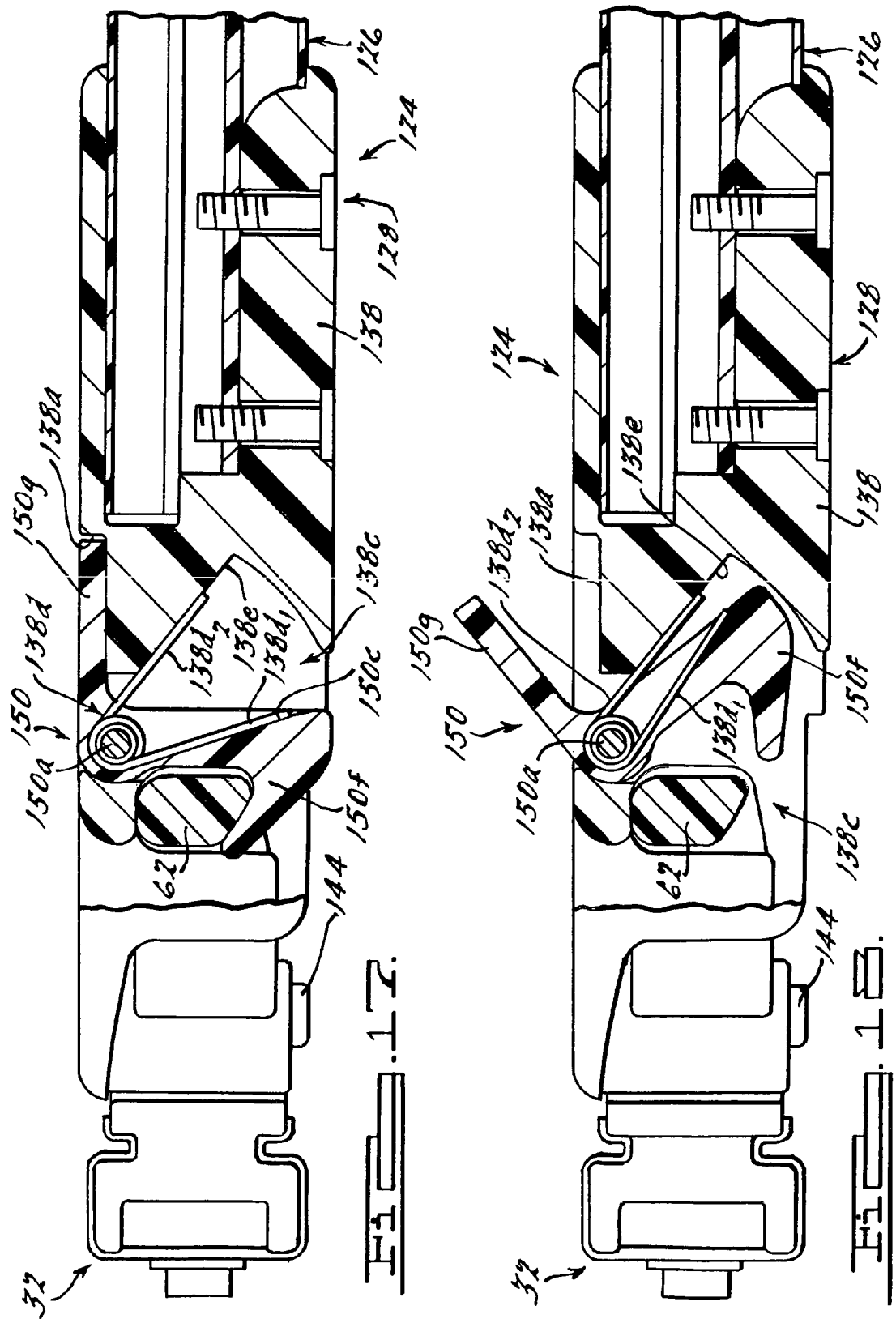

VEHICLE ARTICLE CARRIER HAVING COOPERATIVE TIE-DOWN AND LOAD BAR ASSEMBLIES

FIELD

The present disclosure relates to vehicle article carrier systems and, more particularly, to a vehicle article carrier system employing a pair of adjustable tie-down assemblies that can be used to removably support an independent load bar assembly.

BACKGROUND

Vehicle article carriers are used in a wide variety of applications to transport cargo and variously shaped articles. Often, such systems employ a pair of support rails that are secured in spaced apart relation to one another on a body surface of the vehicle. Often, one or more crossbars are secured to the support rails. The crossbar (or crossbars) is typically used to support cargo or variously shaped articles thereon or to assist in restraining articles. In some systems, the crossbar is adjustably positionable in various positions along the support rails.

With systems as described above, the crossbars are typically not readily removable from the support rails once installed on the support rails. This is because the crossbar typically uses some form of end support at each of its opposite ends that engages within a track or channel in each of the support rails. Thus, once attached to the support rails, the only means for removing a crossbar is to move it slidably to the terminal end of each support rail. In some applications, the opposite ends of each support rail will be blocked off by some form of support structure that secures the support rail to the vehicle body surface. Even if such is not the case, removing the crossbar may entail the need to rearrange cargo being supported by an adjacent crossbar, or if the crossbar is employed in the bed of a pick-up truck, possibly removing articles rearwardly positioned in the bed relative to the crossbar that one desires to remove. Thus, removing a crossbar from its support rails, with existing systems, may involve one or more additional steps that add time and complexity to the operation of removing the crossbar.

Previously developed vehicle article carrier systems also may employ some form of tie-down loop that is secured to one of the support rails. Typically, the tie-down loop may include a tap plate that resides within a channel of the support rail, and a threaded stud portion that can be rotated to engage the tap plate to tighten the tie-down loop assembly in a desired position along the support rail. However, aside from enabling attachment of cord-like elements, such as bungee cords thereto, the tie-down assembly is typically not able to perform any additional function.

SUMMARY

The present disclosure relates to a vehicle article system that employs an independent tie-down assembly and an independent load bar assembly. The two assemblies can be readily connected and disconnected from one another, such that the tie-down assembly can be used to support the load bar assembly and/or to engage with cord-like tie-down elements.

In one embodiment, the vehicle article carrier system includes a pair of support rails that are secured to body surfaces of a vehicle in spaced apart relation from one another. The support rails may be secured to a roof portion of a vehicle, such as a station wagon, sport utility vehicle (SUV), a van or any other form of passenger or commercial vehicle. The support rails may also be secured to opposite side walls of a bed of a pickup truck. One tie-down assembly is adjustably secured to an associated first one of the support rails, while a second tie-down assembly may be adjustably secured to a second one of the support rails. Each tie-down assembly includes structure for enabling an individual to quickly and easily lock it at a desired position along its associated support rail. Each tie-down assembly further includes structure that enables a cord-like restraining element, for example, a bungee cord, nylon strap or rubber strap, to be quickly and easily secured thereto. Each tie-down assembly is further able to be engaged with a portion of the load bar assembly so that it is able to support one end of the load bar assembly while still enabling the load bar assembly to be easily detached therefrom when the load bar assembly is not required for use.

In another embodiment, each end support of the load bar assembly makes use of a pivotally mounted locking member. Each end support can be secured and detached from its associated tie-down assembly by a quick and convenient pivotal movement of the locking member. A biasing element operably associated with the locking member maintains the locking member in locked engagement with its respective tie-down assembly.

In one embodiment the load bar assembly includes an end support at each opposite end thereof. Each end support includes structure that is able to engage with one of the tie-down assemblies. Each end support further includes a locking element that enables it to be locked to its associated tie-down assembly. When the end supports of the load bar assembly are each in their locked position, the load bar cannot be removed from the tie-down assemblies. However, when placed in their unlocked positions, the end supports can be quickly and easily detached from their associated tie-down assemblies.

The vehicle article carrier system and method of the present disclosure thus adds significant utility by providing tie-down assemblies that can function independently when the load bar assembly is not required for use, but yet can be used to support the load bar assembly when the load bar assembly is required for use.

In one embodiment, the tie-down assemblies can be adjustably positioned along the support rails regardless of whether the load bar assembly is secured to the tie-down assemblies or not.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a perspective view of the tie-down assembly of FIG. 2;

FIG. 7 is an exploded perspective view of the tie-down assembly;

FIG. 10 is a cross-sectional side view of the tie-down assembly with the release element in its locked position taken in accordance with section line 10-10 in FIG. 6;

FIG. 16 is a bottom plan view of the assembly shown in FIG. 14, with the end support coupled to the tie-down assembly;

FIG. 17 is a cross-sectional view in accordance with section line 17-17 in FIG. 14 illustrating the pivotally mounted locking member engaged with a portion of the tie-down assembly;

DETAILED DESCRIPTION

The following description is merely exemplary in nature and is not intended to limit the present disclosure, application, or uses.

Figure 1:
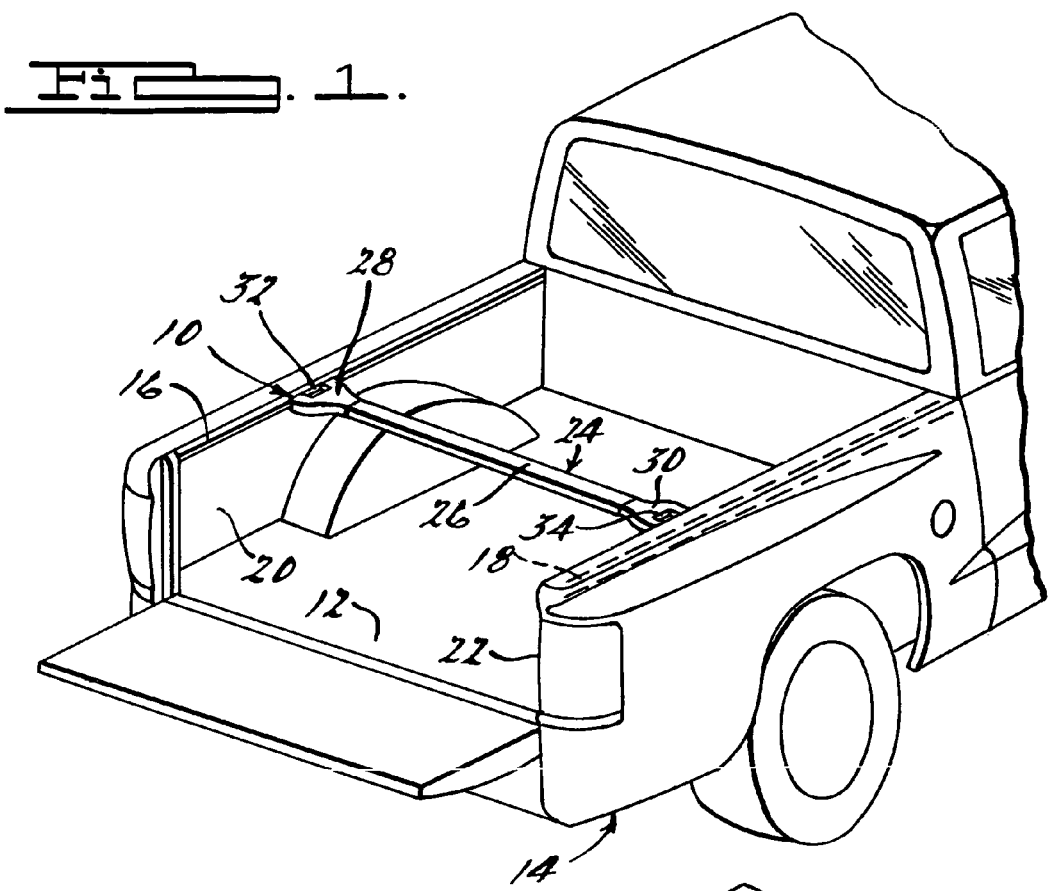
FIG. 1 is a perspective view of a pick-up truck having a bed in which an embodiment of a vehicle article carrier system in accordance with the present disclosure is illustrated in perspective.

Referring to FIG. 1, there is shown a vehicle article carrier apparatus 10 disposed within a bed 12 of a pick-up truck 14. It will be appreciated immediately that the apparatus 10 may be used with other vehicles such as sport utility vehicles (SUVs), station wagons, vans, etc. Thus, the depiction of the apparatus 10 being used with a pick-up truck is merely meant to represent one possible implementation of the apparatus.

Figure 1A:
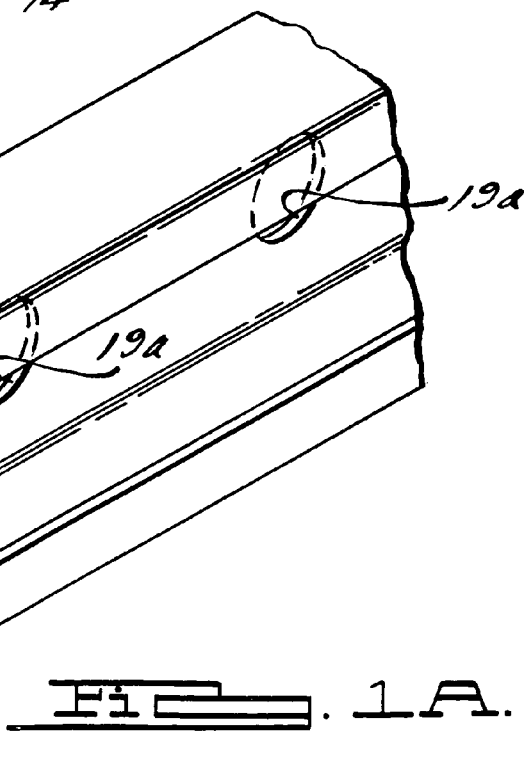
FIG. 1A is a perspective view of a portion of one of the support rails.

The apparatus 10 includes a pair of identical support rails 16 and 18 secured to opposite side walls 20 and 22, respectively, of the pick-up bed 12. With brief reference to FIG. 1A, a portion of support rail 16 is shown. Each of the support rails 16 and 18 includes a channel 19 that runs its entire length. The channel 19 includes a plurality of spaced apart holes 19a therealong.

Referring further to FIG. 1, spanning the distance between the support members 16 and 18 is a load bar assembly 24. The load bar assembly 24 includes a load bar 26 and end supports 28 and 30. End supports 28 and 30, in this example are identical in construction. The load bar 26 may include one or more channels extending along its length, such as in accordance with the crossbar described and illustrated in co-pending U.S. provisional patent application Ser. No. 60/811,654, filed Jun. 7, 2006 assigned to JAC Products, Inc., which is hereby incorporated by reference.

Figure 2:
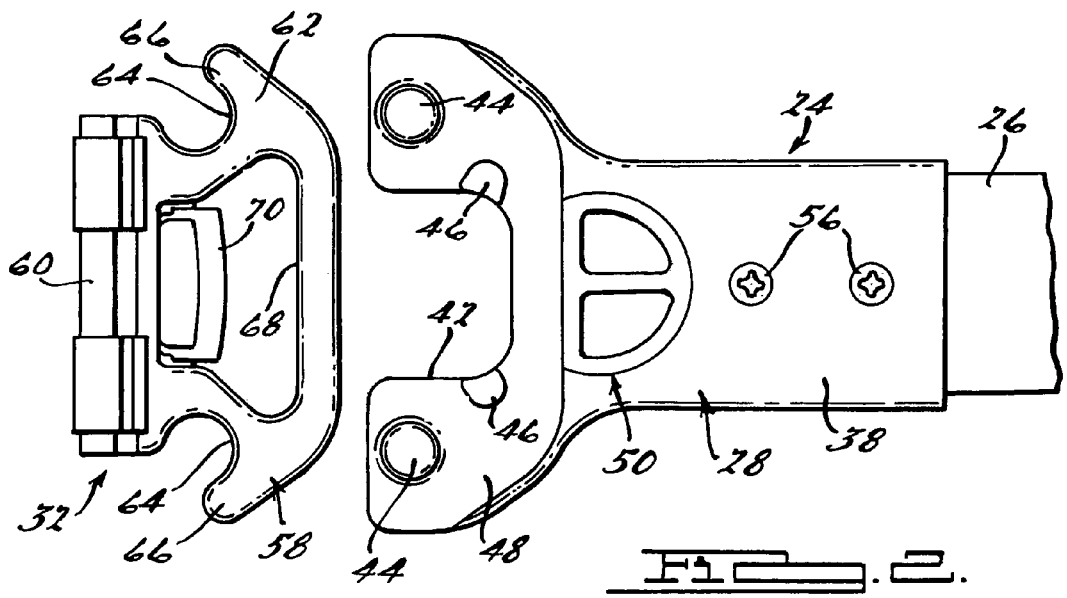
FIG. 2 is a bottom plan view of one end of the crossbar assembly shown in FIG. 1, and more clearly illustrating the tie-down assembly and the end support of the crossbar assembly.

With reference to FIGS. 1 and 2, the apparatus 10 further includes a pair of tie-down assemblies 32 and 34 which are engaged with support rails 16 and 18, respectively. Tie-down assemblies 32 and 34 can be used to support the load bar assembly 24 thereon and to secure the load bar assembly at a desired position along the support rails 16 and 18, as well as to couple with external, cord-like tie-down elements such as bungee cords, nylon straps, rubber straps, etc.

Figure 3:
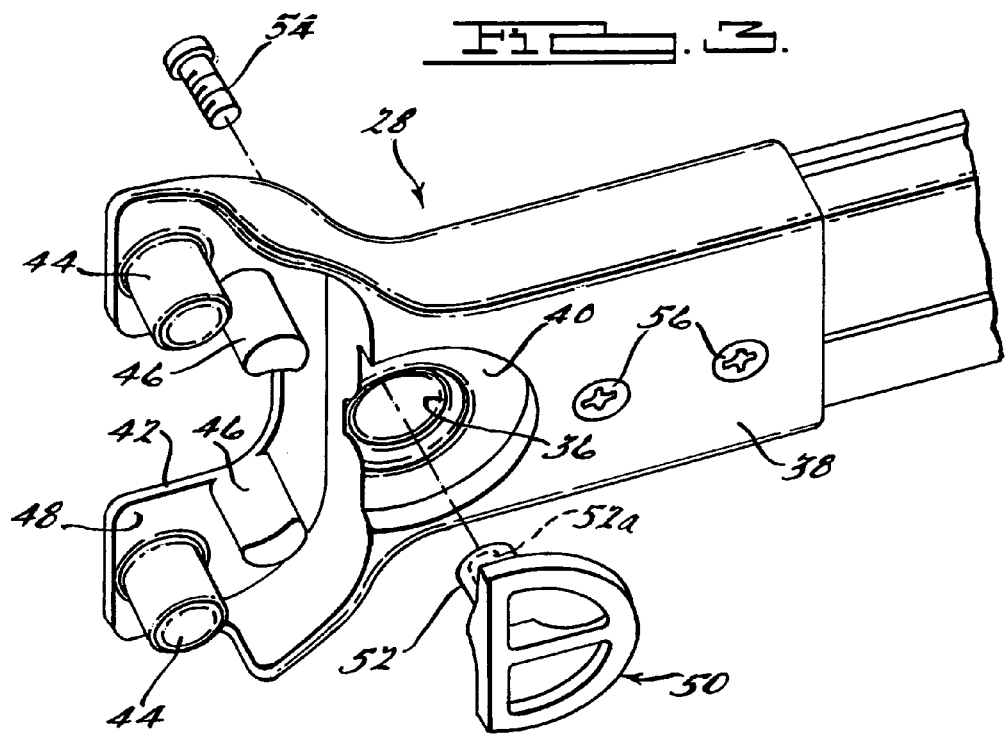
FIG. 3 is an exploded perspective view of the major components of the end support shown in FIG. 2.

Referring to FIG. 3, end support 28 is illustrated in greater detail. End support 28 includes an aperture 36 in a frame portion 38, with a recessed area 40 formed concentrically with the aperture 36. The frame portion 38 further includes a notched area 42 with a pair of circular, spaced apart boss portions 44, and a pair of semi-circular boss portions 46 projecting from an undersurface 48 of the frame portion 38. A manually engagable, disc-like locking element 50 having a neck portion 52 with a threaded blind hole 52a formed therein accepts a threaded fastener 54. The locking element 50 is retained to the frame portion 38, while still being rotatable when engaged by one or more fingers of a hand. The locking element 50 is shown as being D-shaped, but it could be formed in other shapes, such as a triangular shape if desired. The frame portion 38 may be secured to the load bar 26 by conventional threaded fasteners 56.

Referring further to FIG. 2, the tie-down assembly 32 includes a frame portion 58 having a base portion 60 and a tie-down portion 62. The tie-down portion 62 includes a pair of semi-circular cut-outs 64 that help to form hooks 66, and a central opening or aperture 68. Within the central opening 68 is a release element 70. The frame portion 58 may be formed as a single piece component from high strength plastic, such as by injection molding, or it may formed from aluminum or any other suitably strong material.

Figure 4:
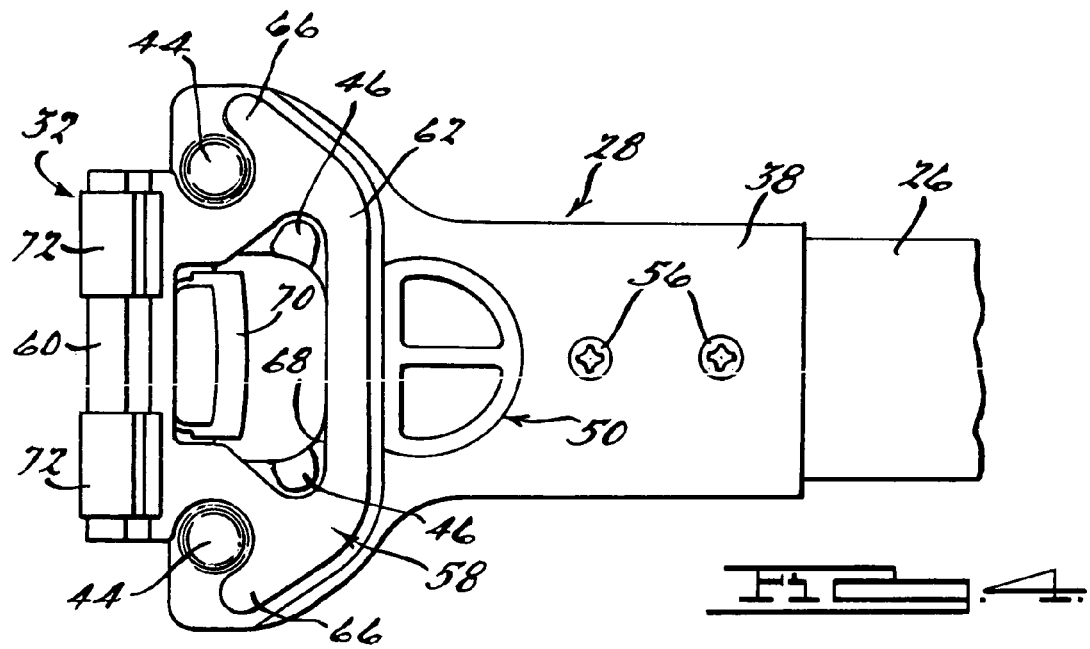
FIG. 4 is a bottom plan view of the end support of FIG. 2 coupled to the tie-down assembly, but not locked thereto.
Figure 5:
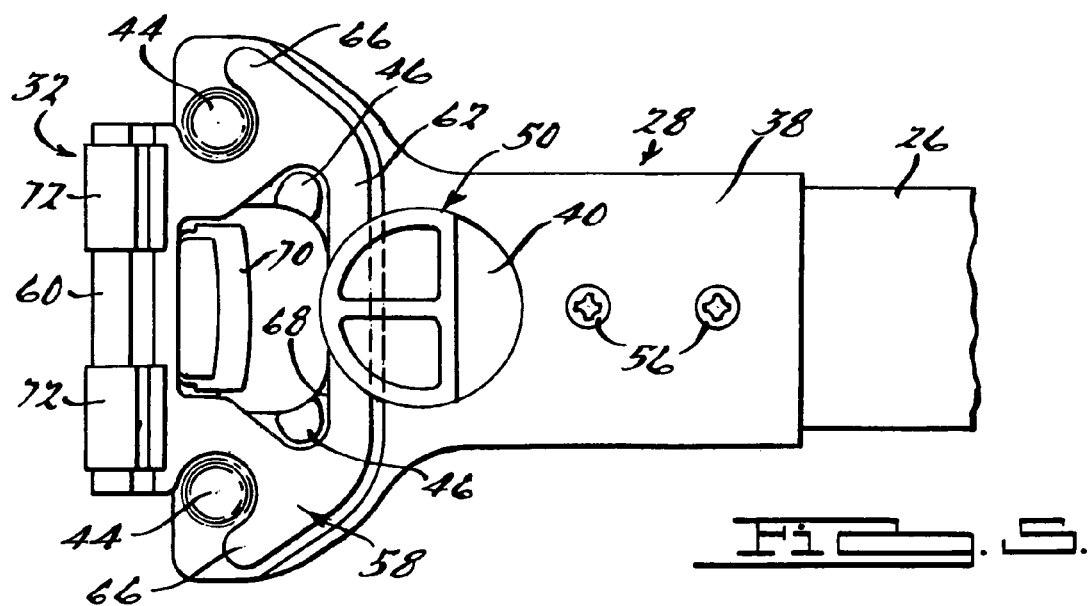
FIG. 5 is a bottom plan view of the end support of FIG. 4 but showing the locking element of the end support rotated 180° to lock it to the tie-down assembly.

With reference to FIGS. 4 and 5, the attachment of the end support 28 to the tie-down assembly 32 will be described. The end support 28 is attached to the tie-down assembly 32 by laying the boss portions 44 within the cut-outs 64 of the tie-down assembly, and the boss portions 46 within the central opening 68. Boss portions 44 and 46 thus restrain end support 28 from simply sliding off of the tie-down assembly 32. When the locking element 50 is in the position shown in FIG. 4, the end support 28 may be lifted directly off of the tie-down assembly 32. Rotating the locking element 50 clockwise or counterclockwise 180° from the position shown in FIGS. 2 and 4 into the position shown in FIG. 5, then positions part of the locking element 50 over the frame portion 58 of the tie-down assembly 32. This prevents the end support 28 from being lifted off of the tie-down assembly 32 while the bosses 44 and 46 prevent lateral movement of the end support 28 on the tie-down assembly 32. Advantageously, the locking element 50 does not interfere with the ability of an individual to grasp the release element 70 with a pair of fingers. Thus, the tie-down assembly 32 can be adjustably positioned along its associated support rail 16 regardless of whether the load bar assembly 28 is attached to it or not.

Figure 13:
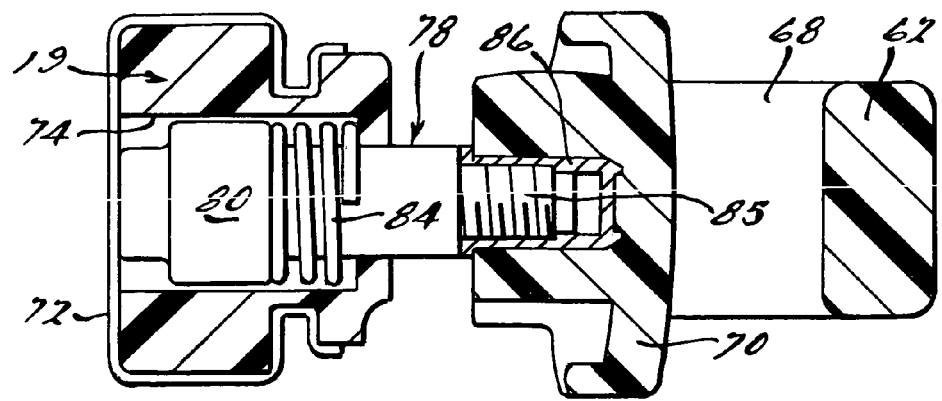
FIG. 13 is a side cross-sectional view of the tie-down assembly with the release element held in the unlocked position.

Referring now to FIGS. 6-13, the construction of the tie-down assembly 32 can be seen in greater detail. The base portion 60 is shaped to fit within the C-shaped channel 19 in the support rail 16, as shown in FIGS. 10 and 13. The base portion 60 preferably includes a plurality of nylon sleeves 72 that are placed over the base portion. Nylon sleeves 72 enable easier sliding movement of the base portion 60 within the C-shaped channel 19 of the support rail 16. With reference to FIGS. 7 and 10, the base portion 60 includes a bore 74 for receiving a locking assembly 76. The locking assembly 76 includes a locking element in the form of a locking pin 78 having a shoulder portion 80, an integrally formed drive socket 82 (visible only in FIG. 7), a biasing element in the form of coil spring 84, and a threaded end portion 85. A sleeve 86 is press fit into a blind hole 88 in the release element 70, and includes a threaded bore 90 which receives the threaded end portion 85 of the locking pin 78. One side of the coil spring 84 rests against an interior surface 92 of the base portion 60, while the opposite side of the coil spring 84 rests against the shoulder 80. Once the locking pin 78 and coil spring 84 are assembled to the release element 70, the release element 70 may be pulled away from the base portion 60 by grasping it with a pair of fingers. The release element 70 can also be turned rotationally either clockwise or counterclockwise. With brief reference to FIG. 8, a bottom surface 93 of the release element 70 includes a first pair of notches or recesses 94. Adjacent each of the notches 94 is a pair of shoulder portions 96a and 96b.

Figure 8:
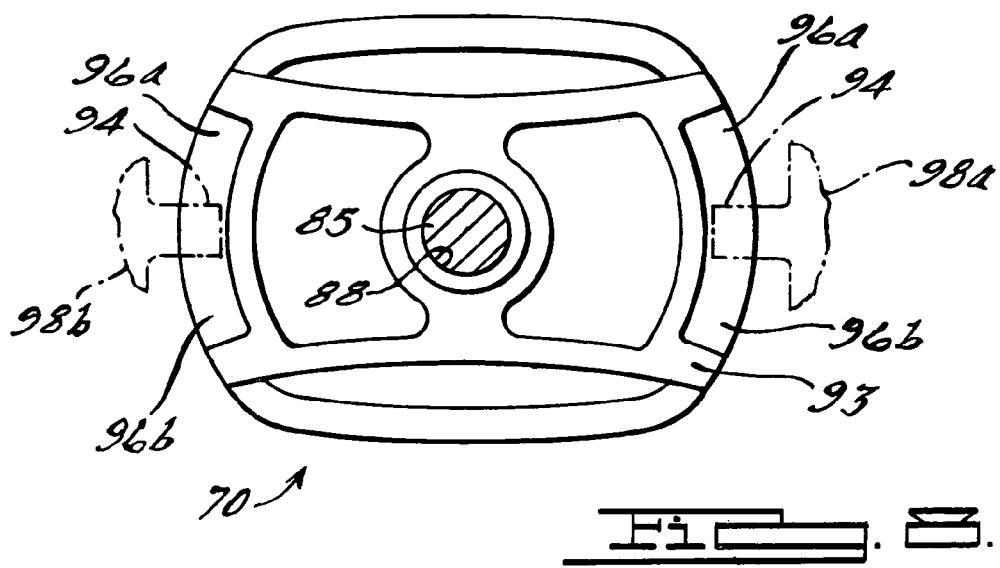
FIG. 8 is a plan view of a bottom surface of the release element and showing where the projecting portions would be engaged with the notches in the release element.
Figure 9:
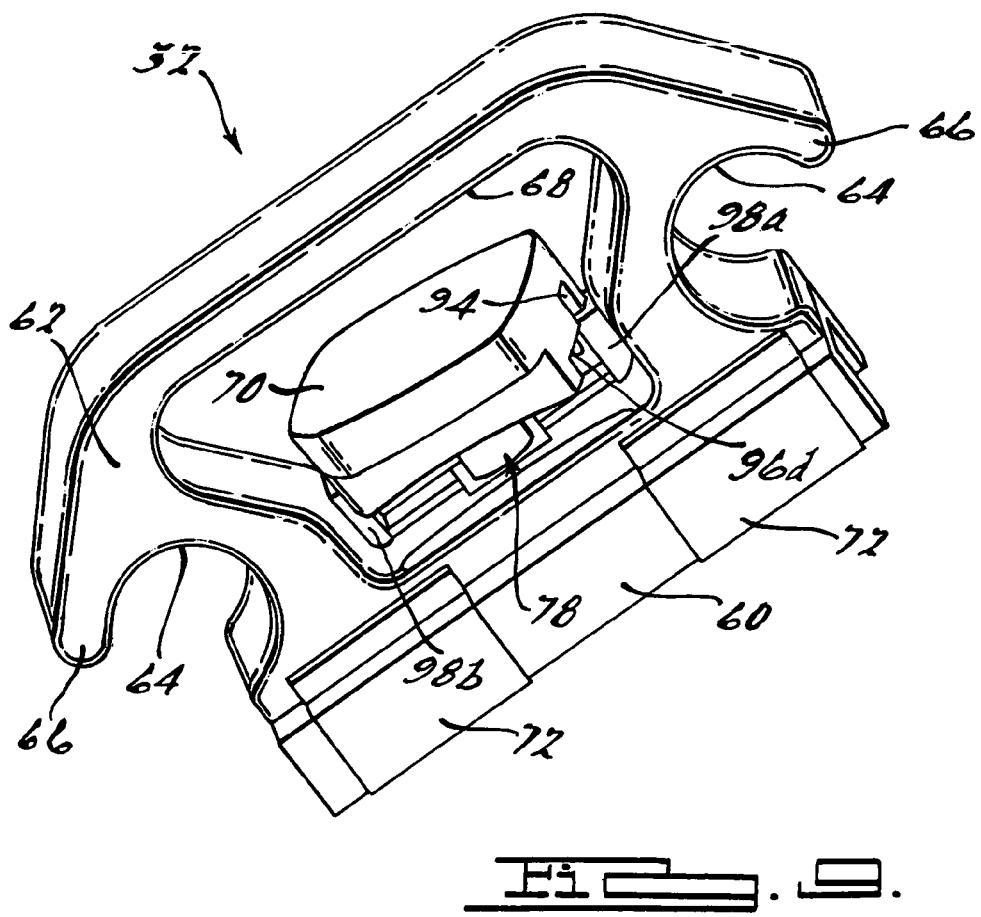
FIG. 9 is a perspective view of the tie-down assembly showing the release element being held in its retracted position.
Figure 12:
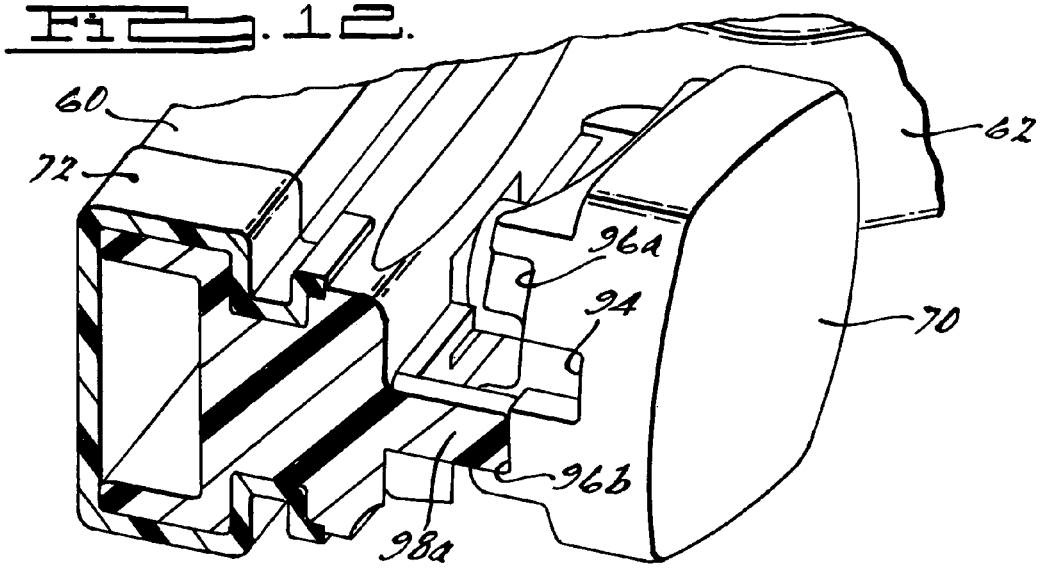
FIG. 12 is a perspective, cross-sectional view of a portion of the tie-down assembly with the release element having been axially withdrawn and then notated into an unlocked position, and being held in the unlocked position by the projecting portion.

With brief reference to FIGS. 7-9, the base portion 60 can be seen to include a pair of projecting portions 98a and 98b. The projecting portions 98a and 98b have a shape that enables them to engage within either the notches 94 or the shoulder portions 96a, 96b, depending upon the rotational position of the release element 70.

Figure 11:
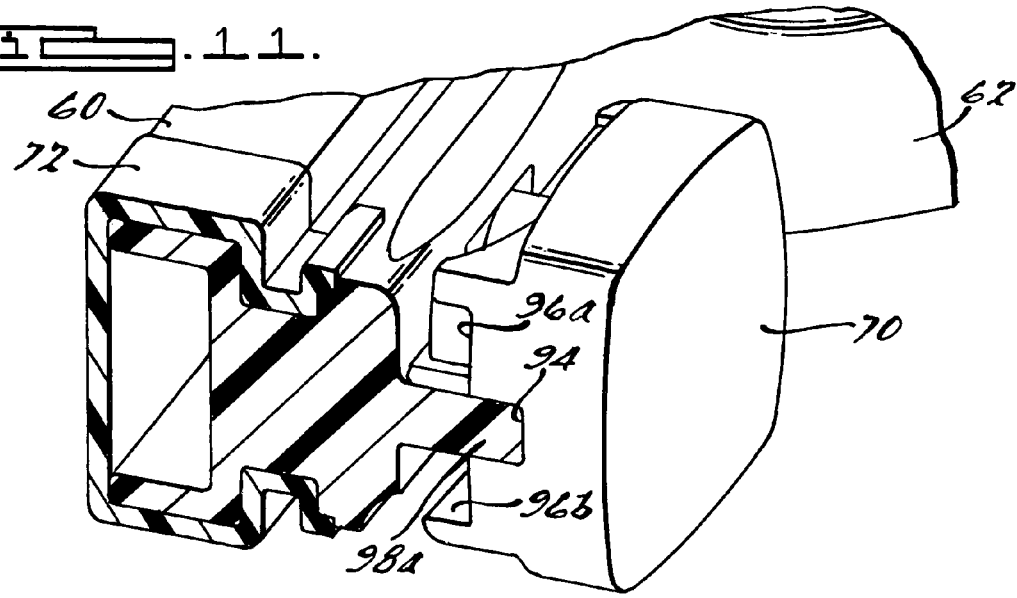
FIG. 11 is a perspective cross-sectional view of a portion of the tie-down assembly of FIG. 10 showing the release element engaged with one projecting portion of the base portion, when in the locked position.

Referring to FIGS. 10 and 11, the release element 70 can be seen in its locked position. In this position, the locking pin 78 is engaged within one of the spaced apart holes 19a in the channel 19 of the support rail 16, provided the locking pin 78 is aligned with one of the holes 19a. In FIG. 11, the projecting portions 98a and 98b are aligned with the notches 94, with only one notch 94 and one projecting portion (98a) being visible in FIG. 11. To unlock the release element 70, the user may grasp it with two fingers and pull it away from the base portion 60, and then rotate it slightly in either direction until projecting portions 98a and 98b are resting on one shoulder portion pair 96a, 96b. At this point, the user may release the release element 70 and the biasing force provided by the coil spring 84 maintains the release element 70 in this position (i.e., the retracted or unlocked position). Placing the release element 70 and the locking pin 78 back into their locked positions merely involves the user grasping the release element 70 and rotating it in the opposite direction slightly, by a few degrees, until the projecting portions 98a and 98b move over the notches 94. At this point the biasing force of the coil spring 84 urges the locking pin 78 outwardly away from the base portion 60, while simultaneously retracting the release element 70 so that the projecting portions 98a, 98b engage the notches 94. Thus, the tie-down assembly 32 can be placed in a locked or unlocked position relative to its support rail 16 with a quick and easy axial and rotating motion of the release element 70. No external tools are required to lock or unlock the tie-down assembly to the support rail 16.

Figure 14:
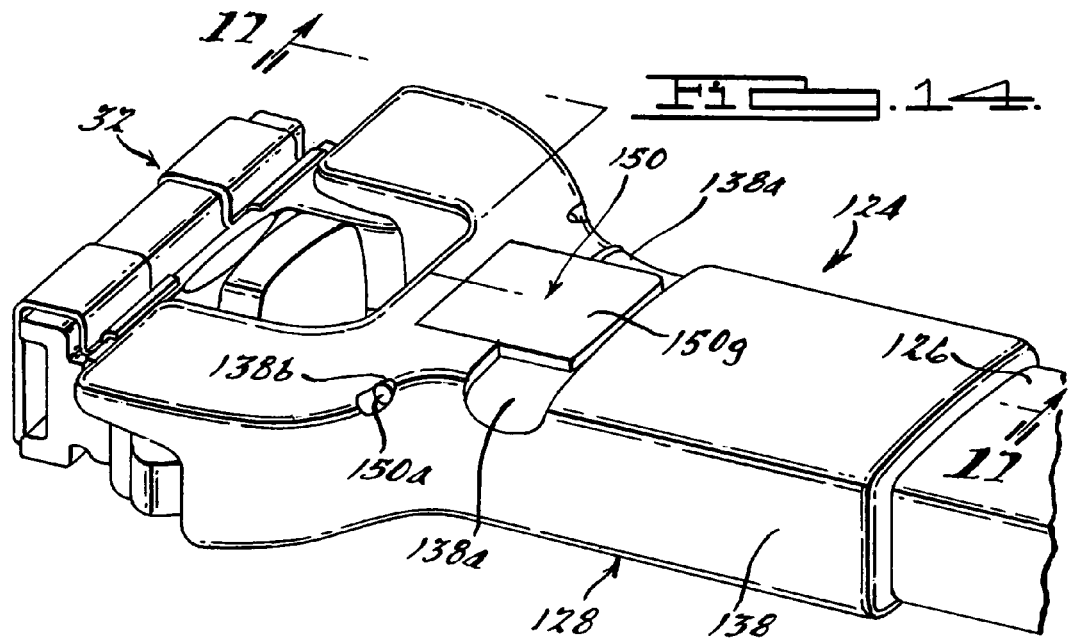
FIG. 14 is a perspective view of an alternative implementation of the crossbar assembly that makes use of a pivoting locking lever, rather than a rotatable locking element.

Referring to FIG. 14, a load bar assembly 124 in accordance with an alternative embodiment of the present system is disclosed. It will be appreciated that components in common between load bar assembly 24 and load bar assembly 124 are designated by reference numerals increased by 100 over those used to describe load bar assembly 24.

Load bar assembly 124 includes an end support 128 at one end thereof which is substantially identical to the end support 28 with the exception of a pivotally mounted locking element 150. It will be appreciated that the load bar assembly 124 includes another end support at its opposite end (not shown in FIG. 14) that is preferably identical in construction and operation to end support 128.

The end support 128 includes a frame portion 138 which has a pair of scalloped areas 138a positioned adjacent the locking member 150. A bore 138b also extends through the frame portion 138 for mounting a pivot pin 150a. The frame portion 138 is secured by conventional threaded fasteners (not shown) to a load bar 126.

Figure 15:
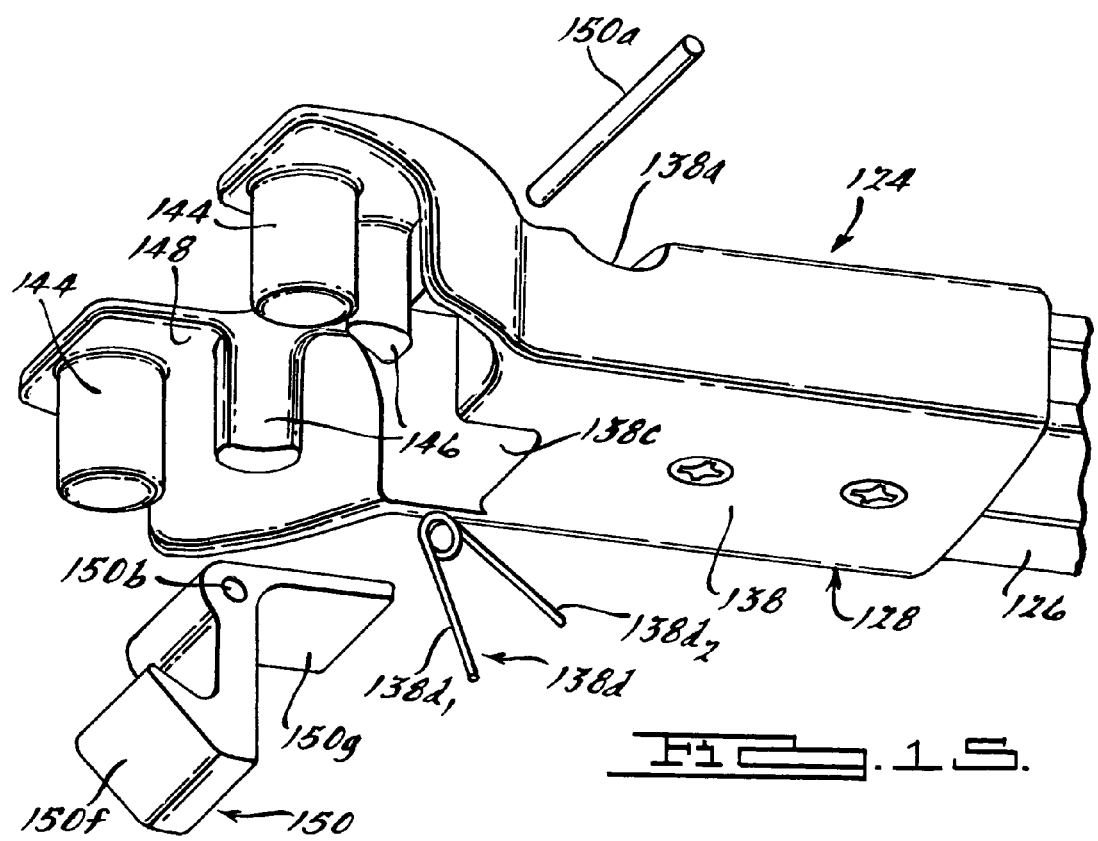
FIG. 15 is an exploded perspective view of the end support of the crossbar assembly shown in FIG. 14.

Referring to FIG. 15, the locking member 150 can be seen to include a bore 150b through which the pivot pin 150a extends when the locking member 150 is assembled to the frame portion 138. Frame portion 138 also includes spaced apart boss portions 144, and a pair of semi-circular boss portions 146, that all project from an under surface 148 of the frame portion 138. The frame portion 138 further includes a cut-out 138c within which the locking member 150 resides. A biasing spring 138d is positioned adjacent the locking member 150 within the cut-out area 138c to bias the locking member 150 into a normally locked or closed position, as shown in FIGS. 16 and 17.

Figure 19:
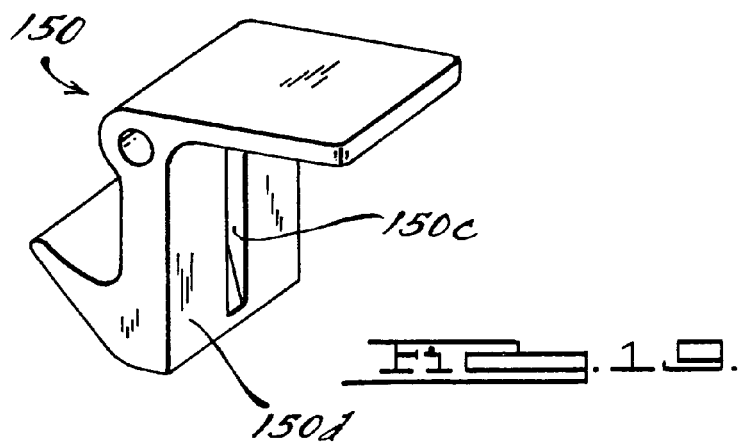
FIG. 19 is a rear perspective view of the locking member.

With brief reference to FIGS. 17 and 19, the locking member 150 includes a groove 150c formed in a rear surface 150d of the locking member 150. An upper portion of the groove 150c opens into the bore 150b (FIG. 17), which enables the pivot pin 150a to extend through the opening in the biasing element 138d once the end support 124 is assembled. The groove 150c helps to maintain leg 138d, the biasing element 138d centered on wall portion 150d. Jaw portion 150f enables the locking member 150 to engage the tie-down portion 62 of the tie-down assembly 32, as illustrated in FIG. 16.

Figure 18:
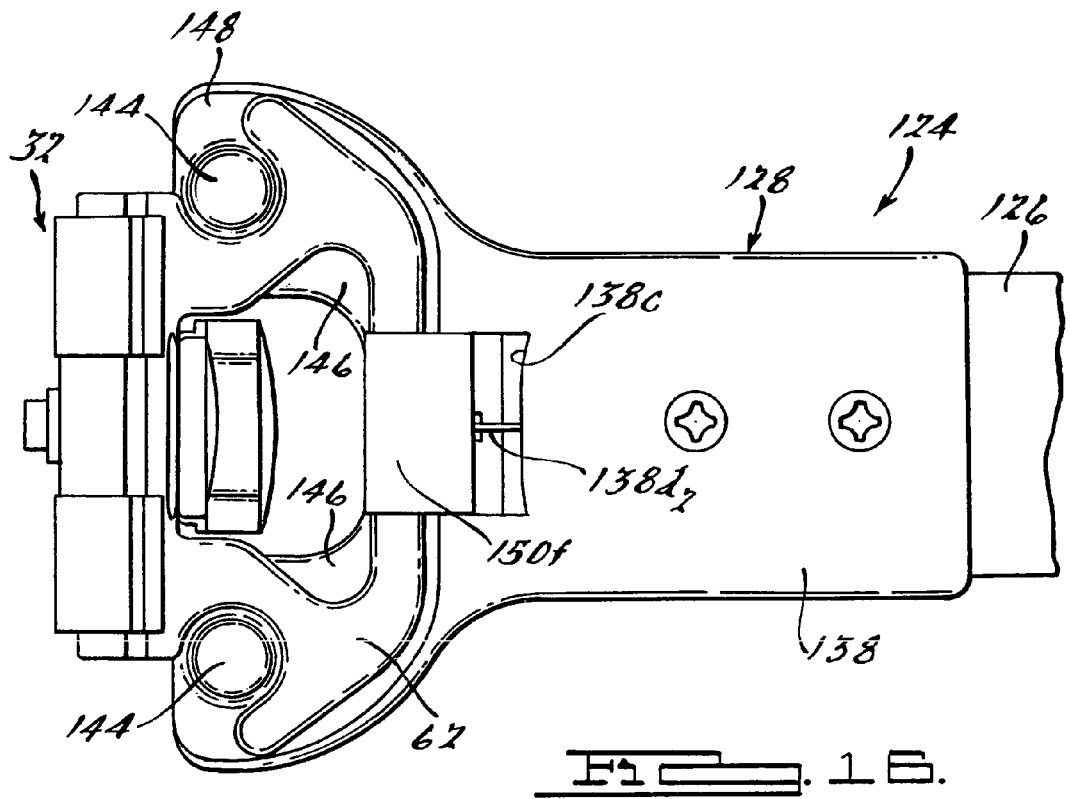
FIG. 18 is a view of the end support of FIG. 17 but showing the locking member in an unlocked condition.

With reference to FIG. 17, once assembled, the biasing element has one leg $138d_1$ resting within the groove 150c of the locking member 150, and the other leg $138d_2$ resting against a wall portion 138e of the frame portion 138. Graspable portion 150g enables the locking member 150 to be rotated about the pivot pin 150a between the locked position, shown at FIG. 17, and an unlocked position as shown in FIG. 18. As soon as the user releases portion 150g, the biasing force of biasing element 138d urges the jaw portion 150f towards and underneath the portion 62 of the tie-down assembly 32, thus locking the end support 128 to the tie-down assembly 32.

The article carrier apparatus 10 thus provides significant additional utility over pre-existing article carrier systems that require a separate tie-down assembly from the crossbar assembly. The tie-down assemblies 32 and 34 enable the load bar assembly 24 to be quickly and easily attached or detached therefrom to meet a variety of cargo carrying needs. When the load bar assembly 24 is not needed, the tie-down assemblies 32, 34 can be used in connection with external bungee cords, nylon straps or other like fastening implements.

While various embodiments have been described, those skilled in the art will recognize modifications or variations which might be made without departing from the inventive concept. The examples illustrate various embodiments of the present disclosure and are not intended to limit it. Therefore, the description and claims should be interpreted liberally with only such limitation as is necessary in view of the pertinent prior art.

What is claimed is:

1. A load bar system for supporting articles above a body surface of a motor vehicle, said system comprising:
    a pair of support rails fixedly secured generally parallel to one another to a pair of spaced apart body portions of said motor vehicle;
    a pair of adjustably positionable tie-down assemblies secured to said support rails, a first one of said tie-down assemblies being secured to an associated first one of said pair of support rails, and a second one of said tie-down assemblies being secured to an associated second one of said pair of support rails;
    each of said tie-down assemblies including a release member and an operatively coupled locking element movable between locked and unlocked positions, relative to its associated said support rail, in accordance with movement of said release member, and being able to accept an external cord-like fastening element for releasable attachment thereto; and
    a load bar assembly releasably secured to said tie-down assemblies for supporting articles thereon, the load bar assembly being detachable from the tie-down assemblies without the need for external tools, while the tie-down assemblies remain secured to the support rails and available for use.

2. The load bar system of claim 1, wherein said load bar assembly comprises:
    an elongated load bar having opposite end portions; and
    an end support secured at each of said opposite end portions, each said end support including a locking assembly, manually manipulatable using only a hand of a user, for locking it to an associated one of said tie-down assemblies.

3. The load bar system of claim 2, wherein each said end support comprises a frame portion; and
    wherein each said locking assembly includes a locking component manually engageable and moveable using the hand of the user, and adapted to engage with a portion of an associated one of said tie-down assemblies when placed in a locked position, to prevent removal of the end support from its associated said locking assembly.

4. The load bar system of claim 3, wherein each said locking component is rotatably coupled to said frame portion of its associated said end support, and movable using the user's hand between a locked position, wherein each said locking component engages a portion of an associated one of said tie-down assemblies, and an unlocked position wherein each said locking component is disengaged from an associated one of said tie-down assemblies, to thus permit said end support to be moved off of said tie-down assembly.

5. The load bar system of claim 4, wherein:
    each said tie-down assembly includes an area for engaging with said external cord-like fastening element; and
    said frame portion of each said end support includes a portion adapted to engage with said area of an associated one of said tie-down assemblies, to enable each said end support to be held to an associated one of said tie-down assemblies even when said locking components are each in said unlocked position.

6. The load bar system of claim 5, wherein said area of each said tie down assembly includes a hook portion, and said portion of said frame portion of an associated one of said tie down assemblies includes a boss portion sized to engage said hook portion.

7. The load bar system of claim 4, wherein said frame portion of each said end support includes a recess, and wherein said locking component is housed within said recess of an associated one of said end supports.

8. The load bar system of claim 1, wherein:
    each said tie-down assembly includes a pair of spaced apart openings for coupling with said external cord-like fastening element; and
    wherein said load bar assembly includes an end support secured at each of opposite end portions of said load bar assembly, each said end support including a pair of projecting portions that engage with said spaced apart openings to restrain said load bar assembly to said tie-down assemblies.

9. The load bar system of claim 4, wherein each said locking component comprises a pivotally mounted locking component having a jaw portion for engaging with a portion of an associated one of said tie-down assemblies.

10. A load bar system for supporting articles above a body surface of a motor vehicle, said system comprising:
    a pair of support rails fixedly secured generally parallel to one another to a pair of spaced apart body portions of said motor vehicle;
    a pair of adjustably positionable tie-down assemblies secured to said support rails, a first one of said tie-down assemblies being secured to an associated first one of said pair support rails, and a second one of said tie-down assemblies being secured to an associated second one of said pair of support rails;
    each of said first and second ones of said tie-down assemblies including:
        a frame portion having at least one cutout with an adjacently positioned hook, the one cutout and the hook adapted to facilitate coupling of an external cord-like element to the frame portion; and
        a release member and an operatively coupled locking element movable between locked and unlocked positions, relative to its associated said support rail, in accordance with movement of said release member, and being able to accept an external cord-like fastening element for releasable attachment thereto; and
    a load bar assembly releasably secured to said first and second ones of said tie-down assemblies, for supporting articles thereon, the load bar assembly including at least one locking element that enables a user to manually lock and unlock the load bar assembly from one of said first and second ones of the tie-down assemblies.

11. A load bar system for supporting articles above a body surface of a motor vehicle, said system comprising:
    a pair of support rails fixedly secured generally parallel to one another to a pair of spaced apart body portions of said motor vehicle;
    a pair of adjustably positionable tie-down assemblies secured to said support rails, a first one of said tie-down assemblies being secured to an associated first one of said pair support rails, and a second one of said tie-down assemblies being secured to an associated second one of said pair of support rails;
    each of said tie-down assemblies including a release member and an operatively coupled locking element movable between locked and unlocked positions, relative to its associated said support rail, in accordance with movement of said release member, and being able to accept an external cord-like fastening element for releasable attachment thereto;
    a load bar assembly releasably secured to said tie-down assemblies, for supporting articles thereon, said load bar assembly including:

an elongated load bar having opposite end portions; and
an end support secured at each of said opposite end portions;
each said end support including a locking assembly for locking it to an associated one of said tie-down assemblies, and for enabling said load bar assembly to be easily removed without external tools from said tie-down assemblies when said load bar assembly is not needed.

12. The load bar system of claim 11, wherein each said end support comprises a frame portion; and
wherein each said locking assembly includes a manually movable locking component adapted to engage with a portion of an associated one of said tie-down assemblies.

13. The load bar system of claim 12, wherein each said locking component is rotatably coupled to said frame portion of its associated said end support, and movable with at least one finger of a hand between a locked position, wherein each said locking component engages a portion of an associated one of said tie-down assemblies, and an unlocked position wherein each said locking component is disengaged from an associated one of said tie-down assemblies, to thus permit said end support to be moved off of said tie-down assembly.

14. The load bar system of claim 13, wherein:
each said tie-down assembly includes an area for engaging with said external cord-like fastening element; and
said frame portion of each said end support includes a portion adapted to engage with said area of an associated one of said tie-down assemblies, to enable each said end support to be held to an associated one of said tie-down assemblies even when said locking components are each in said unlocked position.

15. The load bar system of claim 14, wherein said area of each said tie down assembly includes a hook portion, and said portion of said frame portion of an associated one of said tie down assemblies includes a boss portion sized to engage said hook portion.

16. The load bar system of claim 13, wherein said frame portion of each said end support includes a recess, and wherein said locking component is housed within said recess of an associated one of said end supports.

17. The load bar system of claim 11, wherein:
each said tie-down assembly includes a pair of spaced apart openings for coupling with said external cord-like fastening element; and
wherein each said end support includes a pair of projecting portions that engage with said spaced apart openings to restrain said load bar assembly to said tie-down assemblies.

18. The load bar system of claim 13, wherein each said locking component comprises a pivotally mounted locking component having a jaw portion for engaging with a portion of an associated one of said tie-down assemblies.

* * * * *